United States Patent
Marlow et al.

(10) Patent No.: US 11,828,409 B2
(45) Date of Patent: Nov. 28, 2023

(54) ADJUSTABLE MOUNT FOR SATELLITE COMMUNICATION

(71) Applicant: Hedron Space Inc., Cambridge, MA (US)

(72) Inventors: Weston Alan Marlow, Cambridge, MA (US); Sunil Chintalapati, Cambridge, MA (US); Joseph Atkinson, Cambridge, MA (US)

(73) Assignee: Hedron Space Inc., Cambridge, MA (US)

( * ) Notice: Subject to any disclaimer, the term of this patent is extended or adjusted under 35 U.S.C. 154(b) by 0 days.

(21) Appl. No.: 17/296,451

(22) PCT Filed: Feb. 5, 2021

(86) PCT No.: PCT/US2021/016800
§ 371 (c)(1),
(2) Date: May 24, 2021

(87) PCT Pub. No.: WO2021/158906
PCT Pub. Date: Aug. 12, 2021

(65) Prior Publication Data
US 2022/0381393 A1 Dec. 1, 2022

Related U.S. Application Data

(60) Provisional application No. 62/971,418, filed on Feb. 7, 2020.

(51) Int. Cl.
*F16M 11/20* (2006.01)
*F16M 11/04* (2006.01)
*H01Q 1/12* (2006.01)
*H04B 7/185* (2006.01)

(52) U.S. Cl.
CPC ....... *F16M 11/2085* (2013.01); *F16M 11/043* (2013.01); *F16M 11/2092* (2013.01); *H01Q 1/125* (2013.01); *H04B 7/18517* (2013.01)

(58) Field of Classification Search
CPC .......... B23Q 1/285; B23Q 1/42; B23Q 1/621; F16M 11/043; F16M 11/2085; F16M 11/2092; H01Q 1/125; Y10T 74/20354
See application file for complete search history.

(56) References Cited

U.S. PATENT DOCUMENTS

| | | | |
|---|---|---|---|
| 4,607,578 A | 8/1986 | Inoue et al. | |
| 5,613,403 A | 3/1997 | Takei | |
| 6,913,237 B2 * | 7/2005 | Lin | F16M 11/18 248/676 |

(Continued)

*Primary Examiner* — Bradley Duckworth
(74) *Attorney, Agent, or Firm* — Goodwin Procter LLP

(57) ABSTRACT

An adjustable mount for mounting a component subjected to dynamically-varying loads decouples position adjustment of one axis from position adjustment along the other. The mount includes a frame between base and top plates. The frame has apertures for receiving positioners. The positioners abut sides that extend inward from the plates and into the frame. Actuating a positioners causes it to push its corresponding side. This causes relative motion between the frame and the positioner's corresponding plate. Movement interfaces guide these movements during adjustment and locking interfaces lock the frame and the corresponding plate into position after completion of adjustment.

18 Claims, 6 Drawing Sheets

(56) References Cited

U.S. PATENT DOCUMENTS

| | | | |
|---|---|---|---|
| 7,249,535 B2* | 7/2007 | Poulsen | H02N 2/028 |
| | | | 74/490.09 |
| 7,541,719 B2* | 6/2009 | Fujita | B82Y 40/00 |
| | | | 310/328 |
| 7,588,376 B2* | 9/2009 | Friedrich | F16M 11/08 |
| | | | 396/419 |
| 7,637,487 B2* | 12/2009 | Muto | B23Q 1/621 |
| | | | 269/55 |
| 9,033,327 B2* | 5/2015 | Li | B23Q 3/18 |
| | | | 269/73 |
| 10,344,914 B2* | 7/2019 | Cardozo | F16M 13/02 |
| 10,413,971 B1* | 9/2019 | Smith | B23B 29/025 |
| 10,458,594 B2* | 10/2019 | Burton | A47G 1/205 |
| 10,883,652 B2* | 1/2021 | Wang | F16M 11/08 |
| 2008/0011912 A1 | 1/2008 | Liao | |
| 2019/0051974 A1 | 2/2019 | Schlosser | |
| 2020/0380895 A1* | 12/2020 | Nakano | H05K 5/0217 |

\* cited by examiner

ADJUSTABLE MOUNT FOR SATELLITE COMMUNICATION

CROSS-REFERENCE TO RELATED APPLICATIONS

This application is a national phase under 35 U.S.C. 371 of International Application No. PCT/US2021/016800 filed on Feb. 5, 2021, which claims priority to U.S. Application No. 62/971,418 filed on Feb. 7, 2020, the contents of all of which are hereby incorporated by reference in their entireties.

BACKGROUND OF THE INVENTION

This invention relates to mounting a component, and in particular, to mounting a component at a fixed position notwithstanding variable forces acting on the component.

In a typical optical system, various components send and receive light to each other. When light travels from one component to another via an optical fiber, the relative positions of the components are not particularly important.

On the other hand, there exist optical systems in which light travels in free space from one component to another or from a source to a component. In such cases, it is important to place the component where the light is going to be. This requires precision mounting of components.

In principle, precision mounting is a simple task: one carefully places each component at the correct location. If no external forces act on the component, it will stay at that location.

The difficulty, however, is that external force is unavoidable. At the very least, there exists a force of gravity. In addition, the system may itself move. Such movement often involves acceleration, which again results in force. These forces will tend to cause components to shift relative to each other, thus disturbing the careful alignment of the system.

One way to minimize this difficulty is to isolate the system from external forces. This is often achieved by mounting the components to an optical table.

This method is satisfactory when the optical system is being used in a stable environment. However, in some cases, the optical system is on a moving platform whose orientation relative to the gravity field may change over time. In such cases, it is not practical to use an optical table.

SUMMARY OF THE INVENTION

In a general aspect of the invention, an apparatus comprises a mount for mounting a component that is subjected to a dynamically-varying load. The mount comprises a base plate to be fastened onto a support, a top plate, and a frame between the base plate and top plate. The frame has an interior that is defined by first, second, third, and fourth walls. The first and second walls define corresponding first and second apertures for receiving first and second positioners. The third and fourth walls are opposite the first and second walls, respectively. The mount further comprises first and second sides that extend from the base plate and into said frame's interior. The first side faces the first aperture such that, when inserted through the first aperture, the first positioner abuts the first side. The second side defines a first gap that is between the second side and the third wall. The mount further comprises third and fourth sides that extend from the top plate and into the frame's interior. The third side faces the second aperture such that, when inserted through the second aperture, the second positioner abuts the third side. The fourth side defines a second gap that is between the fourth side and the fourth wall, and first and second movement interfaces. The first movement interfaces facilitating guided movement of the top plate relative to the frame along a first axis and the second movement interface facilitating guided movement of the frame relative to the base plate along a second axis, and first and second locking interfaces. The first locking interface suppresses the movement along the first axis and the second locking interface suppresses movement along the second axis.

In some embodiments, the frame and the top plate define holes that define the first locking interface. These holes are aligned to receive a bolt. When inserted, the bolt suppresses the movement along the first axis. The second locking interface is defined in a similar way. The frame and the bottom plate define holes that are aligned to receive a bolt that, when inserted, suppresses the movement along the second axis. These holes thus define the second locking interface.

In other embodiments, the first and second movement interfaces comprise complementary structures that engage each other to permit relative movement. Among these are embodiments in which the complementary structures slide relative to each other. An example of two complementary structures is a groove and a tongue that engage the grooves so as to permit relative movement between the tongue and the groove along one of the axes.

In still other embodiments, the first movement interface includes complementary structures that engage each other. In some of these embodiments, the complementary structures are a tongue and a groove. Whether the tongue is on a plate and the groove is on the frame or vice versa is immaterial. As used in the foregoing, "plate" means either the top plate or the bottom plate.

Also among the embodiments are those having a block that extends from the base plate and into the frame's interior. In such embodiments, the first side is a side of the block.

Still other embodiment include a block that extends or protrudes from the top plate and into the frame's interior. In these embodiments, the third side is a side of the block.

Also among the embodiments are those having a block that extends or protrudes from the base plate and into the frame's interior. In such embodiments, the first side is a side of the block.

Some embodiments include first, second, and third blocks. In these embodiments, the first and third blocks extend into the frame from a first direction and the second block, which is disposed between the first and second blocks, extends into the frame from a second direction. In these embodiments, the sides are sides of the blocks. For convenience, the directions will be referred to as "upward" and "downward." Thus, the blocks are upwardly-protruding or upwardly-extending or downwardly-protruding and downwardly-extending. The terms "upward" and "downward" are intended to convey opposite directions are not necessarily defined in terms of a gravity field.

Other embodiments include first, second, and third blocks with the first and third blocks extending into the frame from the top plate and the second block extending into the frame from the bottom plate such that the second block is disposed between the first and third blocks. In these embodiments, the first side is a side of the second block and the third side is a side of the first block. Among these embodiments are those in which the second side is a side of the second block and the fourth side is a side of the third block.

Still other embodiments feature a shim on the top plate.

Additional embodiments include a satellite communication system for communicating with a satellite. In these embodiments, both the component and the mount are constituents of the satellite communication system.

In some embodiments, the positioner includes a positioning screw.

Other embodiments feature one or more blocks that are integral with one of the plates. Among these are embodiments in which the lower plate includes a thickened portion that forms a block that extends into the frame's interior, with the first side being a side of the block. Also among these are embodiments in which the upper plate includes a first thickened portion that forms a block that extends into the frame's interior, with the third side being a side of this block. Also among these are embodiments in which the upper plate includes a first thickened portion that forms a first block that extends into the frame's interior, the upper plate includes a second thickened portion that forms a second block that extends into the frame's interior, the third side is a side of the first block, and the fourth side is a side of the second block.

Still other embodiments include a spring and a pin. In such embodiments, the spring extends across the first gap and defines a passageway. The pin then extends through at most a portion of the passageway defined by the spring.

Other embodiments feature a first spring that extends across the first gap and a second spring that extends across the second gap.

In another aspect, the invention features a method for adjusting a position of a component that is mounted on a mount that includes a frame between first and second plates. Such a method includes causing the first plate to translate relative to the frame along a first axis and causing the second plate to translate relative to the frame along a second axis, with translation of the first plate being decoupled from translation of the second plate.

Some practices of the foregoing method include those in which causing the first plate to translate includes exerting a first force against a face that is within an interior of the frame, Exertion of this first force causes a change in a second force that is exerted along a direction that is opposite that of the first force.

Other practices include, after having caused the first plate to translate, clamping the first plate to prevent further movement along the first axis, and, after having caused the second plate to translate, clamping the second plate to prevent further movement in the second axis.

Other features and advantages of the invention are apparent from the following description, and from the claims.

DETAILED DESCRIPTION

Figure 1:
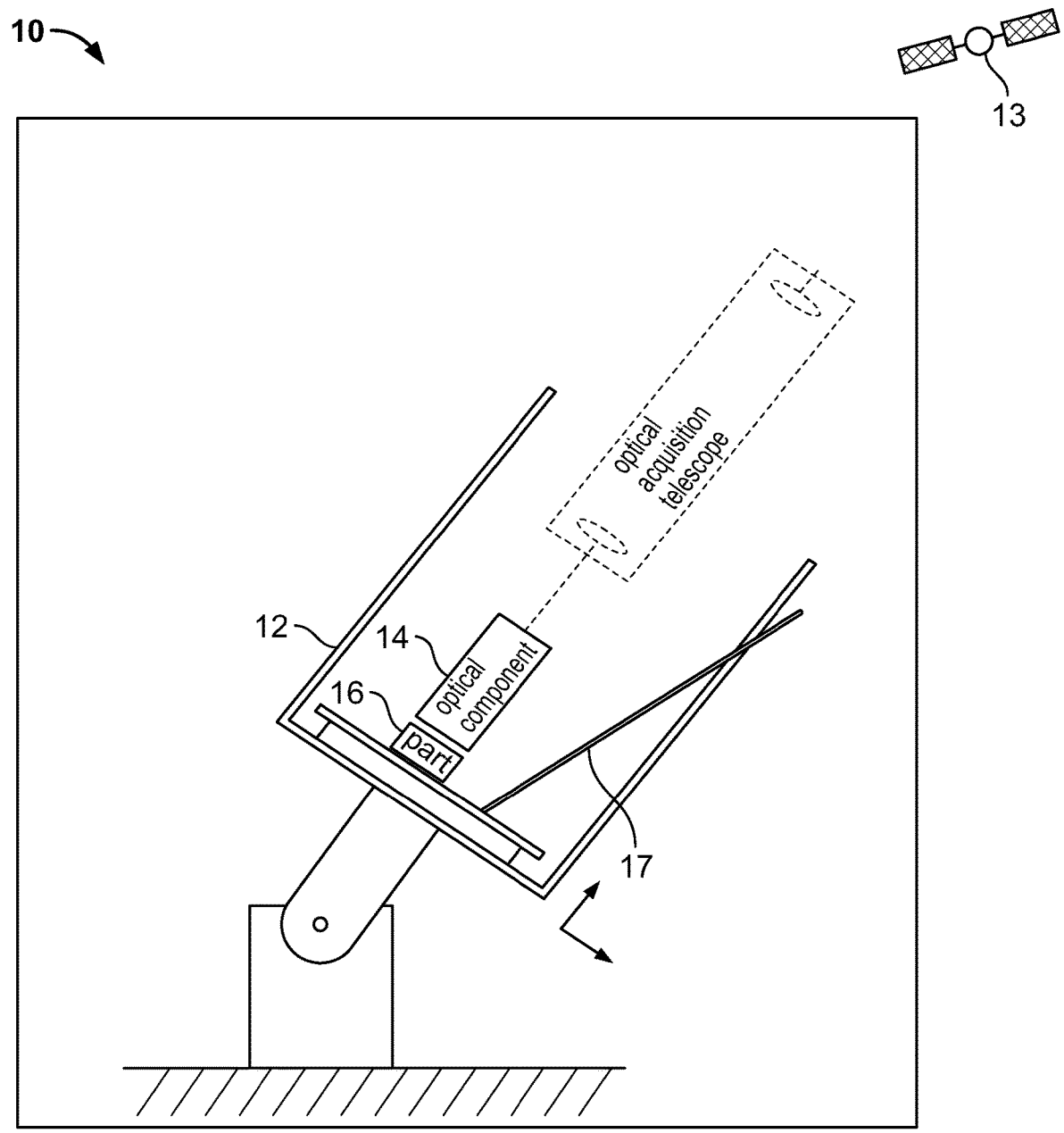
FIG. 1 shows a ground-based communication device having an optical system that uses a mount to mount a component thereof.

FIG. 1 shows a system 10 mounted to a distal end of a ground-based communication device 12 for use in communicating with a satellite 13. Within the system 10 is a component 14. In general, this component 14 is just one of many others that have been omitted for clarity. In some embodiments, the system 10 is an optical system and the component 14 is an optical component. However, the apparatus and methods disclosed herein are applicable to other systems in which precision alignment is important.

In some cases, the ground-based communication device 12 is moveable, for example, when the ground-based communication device 12 is tracking a satellite 13, or when the ground-based communication device 12 that has been pointing at one satellite has to be moved to point to a different satellite 13. This results in a change to the forces acting on the component 14. Such changes may cause the component 14 to shift.

Figure 2:
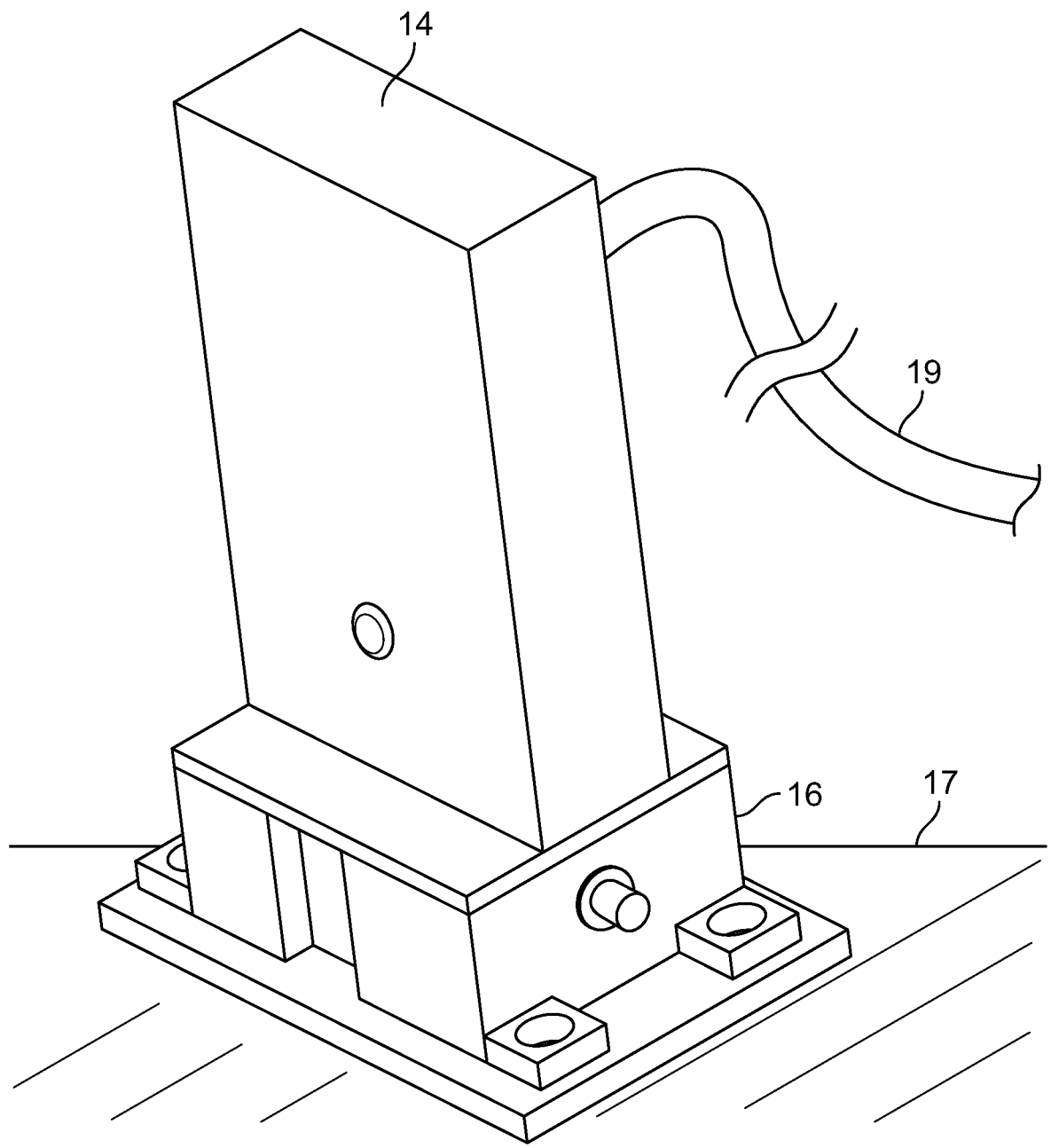
FIG. 2 shows details of the mount and the component shown in FIG. 1.

To avoid this, the system 10 includes an adjustable mount 16 that permits the component's position to be adjusted with high precision and to then lock the adjustment in place after completion. As shown in FIG. 2, the adjustable mount 16 is mounted to a support 17. IN this embodiment. a cable 19 provides data communication between the component 14 and the rest of the system 10.

Figure 3:
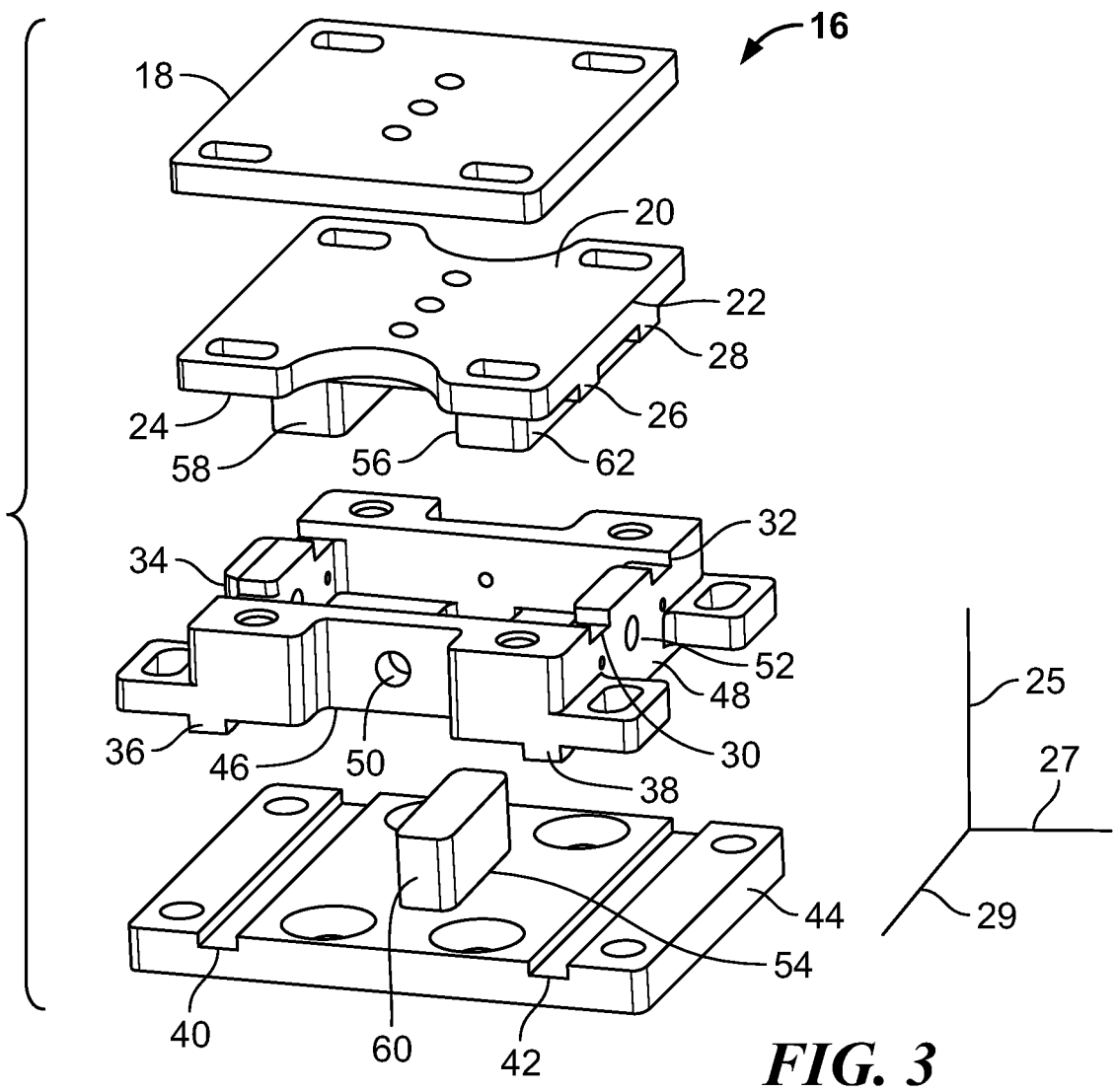
FIG. 3 shows an exploded view of the mount shown in FIG. 2.

FIG. 3 shows an embodiment of an adjustable mount 16 in which an optional shim 18 couples to the component 14. The shim 18 rigidly connects to an upper surface 20 of a top plate 22. By using shims 18 of different thicknesses, it is possible to adjust the position of the component 14 along a vertical axis 25.

A lower surface 24 of the top plate 22 includes parallel first and second tongues 26, 28 that extend along a first transverse axis 27. The first and second tongues 26, 28 slide along corresponding first and second grooves 30, 32 formed in an upper portion of a frame 34. As a result, it is possible to adjust the position of the top plate 22 relative to the frame 34 by moving it along the first transverse axis 27.

The lower portion of the frame 34 includes parallel third and fourth tongues 36, 38 that extend along a second transverse axis 29 perpendicular to the first transverse axis 27. The third and fourth tongues 36, 38 slide along corresponding third and fourth grooves 40, 42 that are formed on an upper surface of a base plate 44 that mounts to support 17. As a result, it is possible to adjust the position of the frame 34 relative to the base plate 44 by moving it along the second transverse axis 29.

A particular advantage of the configuration described herein is that the adjustment along the second transverse axis 29 can be carried out independently of the adjustment along the first transverse axis 27.

The frame 34 includes a first wall 46 that is parallel to the first transverse axis 27 and a second wall 48 that is parallel to the second transverse axis 29. The first and second walls 46, 48 have corresponding first and second apertures 50, 52 formed therethrough.

An upwardly-protruding block 54 projects from the base plate 44 towards the top plate 22 and into the frame 34. Similarly, first and second downwardly-protruding blocks 56, 58 project from the top plate 22 towards the base plate 44. With the adjustable mount 16 having been assembled, as shown in FIG. 4, the first and second downwardly-protruding blocks 56, 58 nestle the upwardly-protruding block 54 between them.

Figure 4:
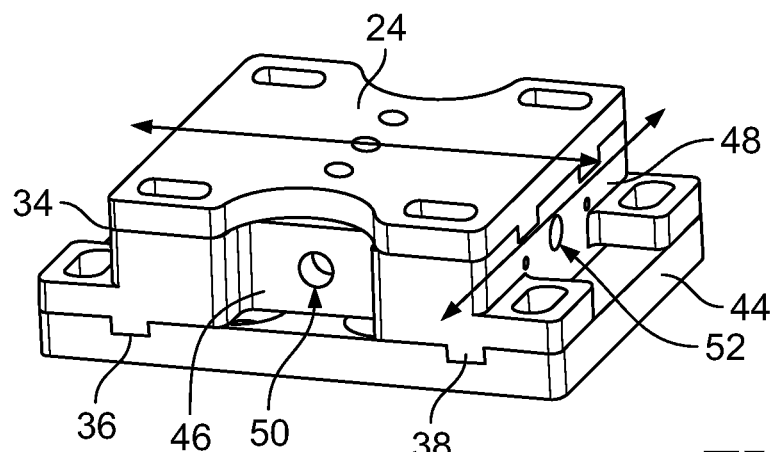
FIG. 4 shows the mount in FIG. 3 after having been assembled.

In the assembled form, which can be seen in FIG. 4, an aperture-facing side 60 of the upwardly-protruding block 54 faces the first aperture 50 and an aperture-facing side 62 of the first downwardly-protruding block 56 faces the second aperture 52. The double-headed arrows shown in FIG. 4 indicate the aforementioned first and second axes along which the frame 34 and the top plate 24 move relative to the base plate 44 in either direction.

Figure 5:
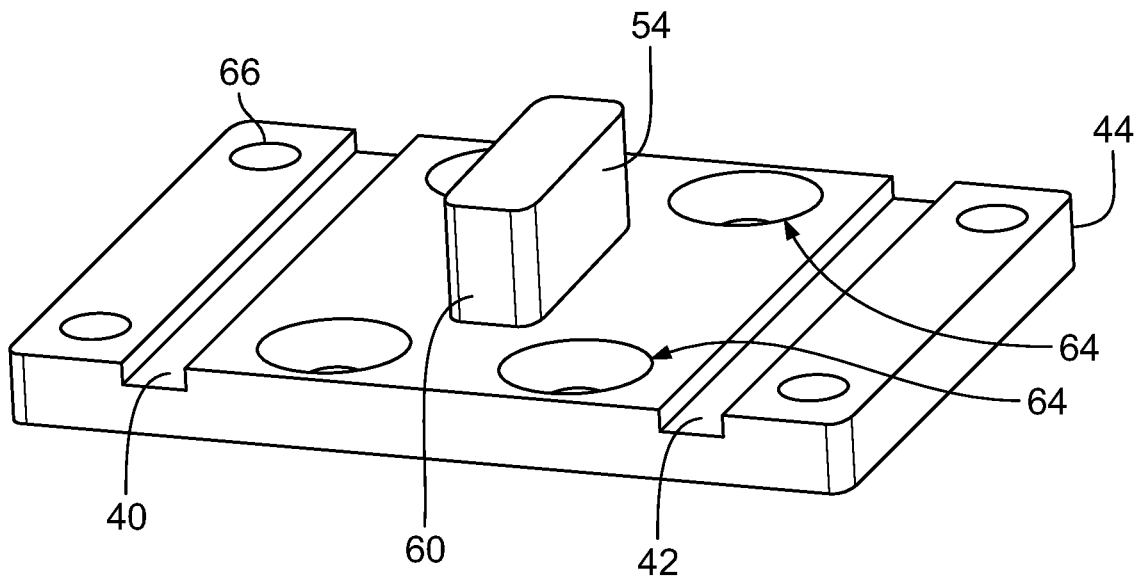
FIG. 5 shows details of the base plate shown in FIGS. 3 and 4.

FIG. 5 shows details of the base plate 44 that are particularly useful for mounting the base plate 44 to the support 19. In particular, the base plate 44 features countersunk holes 64 through which corresponding screws can mount the base plate 44 to the support 19. The use of countersunk holes 64 and corresponding screws is particularly useful for reducing wiggle or play when the base plate 44 is mounted.

In addition, the base plate 44 includes clearance holes 66 through which bolts that clamp the frame 34 to the base plate 44 can continue on past the base plate 44 and be screwed into the support 17.

Figure 6:
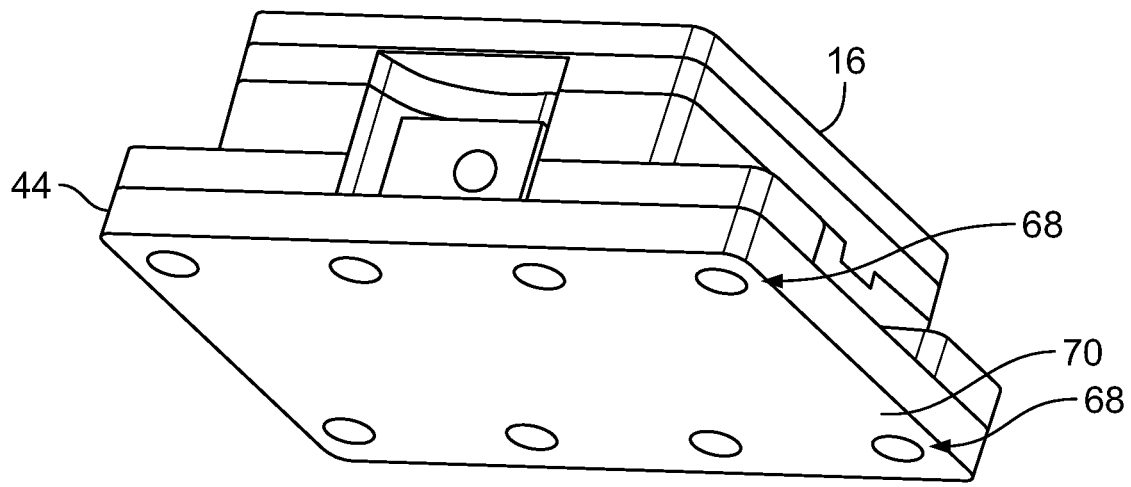
FIG. 6 shows the base plate of FIG. 5 oriented at an angle that exposes mounting holes through a mounting surface thereof.

FIG. 6 shows the base plate 44 oriented to show mounting holes 68 that pass through a mounting surface 70 of the base plate 44. The mounting holes 68 are spaced and aligned to match corresponding mounting holes on a mounting platform, such as a standard optical table. Additionally, the mounting holes 68 are sized to use the standard mounting bolts that are used for mounting components to an optical table.

Figure 7:
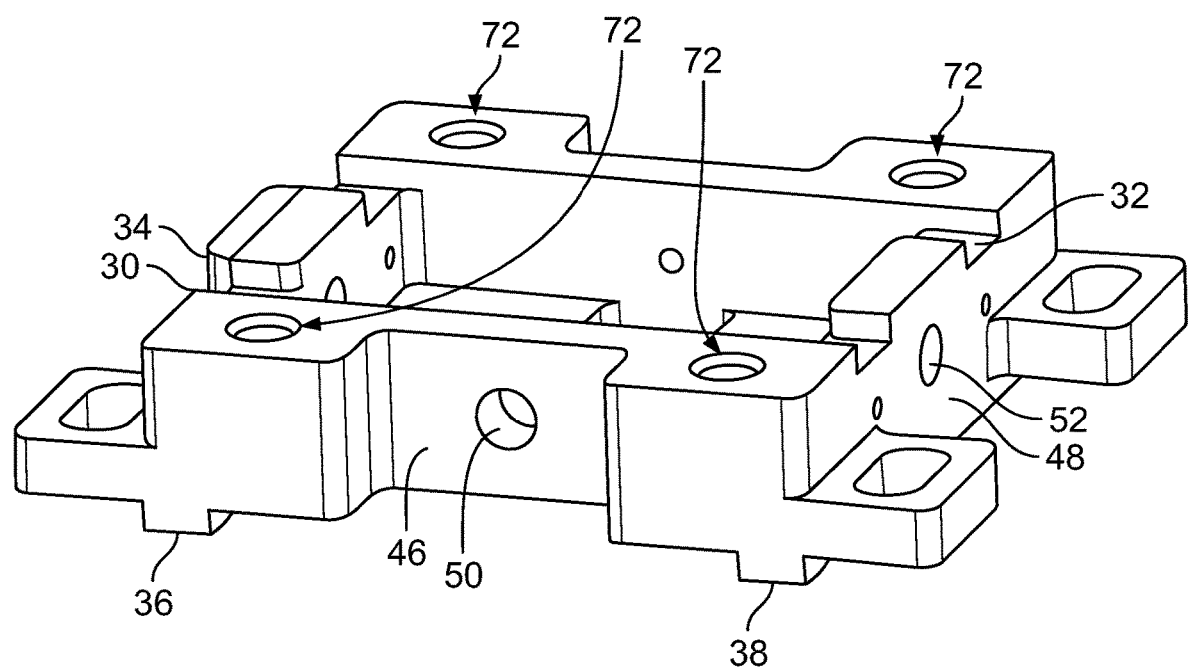
FIG. 7 shows details of the frame of the mount shown in FIGS. 3 and 4.

FIG. 7 shows details of the frame 34, and in particular, threaded holes 72 that extend into the frame 34. These threaded holes 72 permit corresponding bolts to clamp the top plate 24 to the frame 34 once adjustment along the first transverse axis 27 has been completed. Similar threaded holes are provided to clamp the frame 34 to the bottom plate 44 once adjustment along the second transverse axis 29 has been completed.

Figure 8:
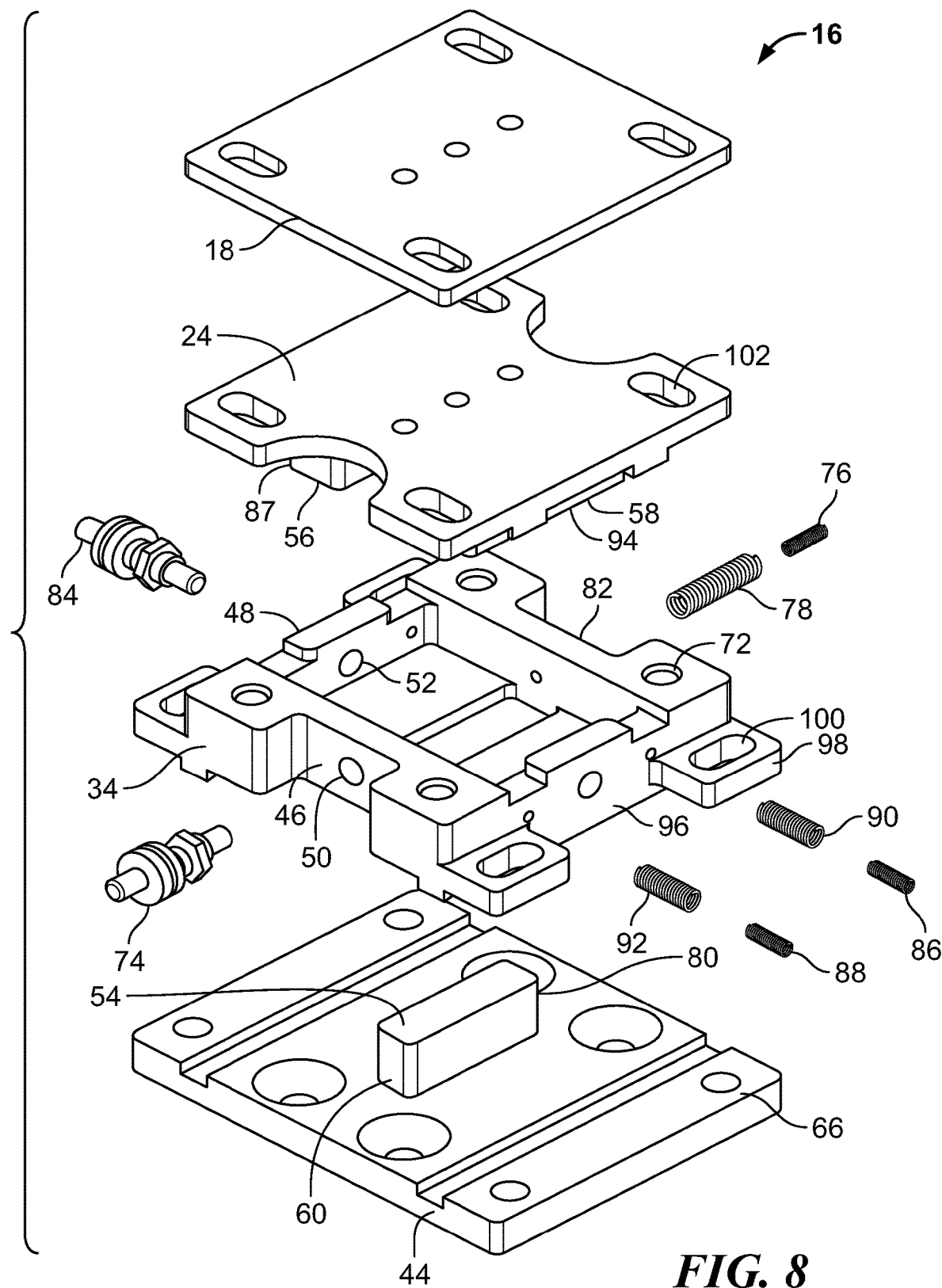
FIG. 8 shows the incorporation of the positioning screws and related hardware in the exploded view shown in FIG. 3.

Referring now to FIG. 8, a first positioner 74 passes through the first aperture 50 so that its distal end rests against the aperture-facing side 60 of the upwardly-protruding block 54. In a preferred embodiment, the first positioner is a positioning screw, such as an AJS8-100-0.5H miniature adjustment screw made by Newport Corporation, a subsidiary of MKS Instruments A first spring 78 extends between a spring-facing side 80 of the upwardly-protruding block 54 and a third wall 82 of the frame 34. In a preferred embodiment, the first spring 78 is a helical spring that is approximately 0.7 inches long in its uncompressed state. A first set screw 76, which is fixed to either the spring-facing side 80 or to the third wall 82 passes through a portion of passageway defined by the helix of the first spring 78. The first set screw 76 thus prevents the first spring 78 from shifting during operation and also prevents the first spring 78 from buckling.

The third wall 82 is parallel to the first wall 46 and perpendicular to the second wall 48. The gap spanned by the first spring 78 is such that the first spring 78 compressed between the upwardly-protruding block 54 and the third wall 82. This causes it to exert a force that urges the upwardly-protruding block 54 back towards the first wall 46.

Adjusting the first positioner 74 in one direction causes the distal tip thereof to move towards the third wall 82. This causes it to exert a force on the aperture-facing side 60 of the upwardly-protruding block 54. The force thus exerted moves the upwardly-protruding block 54 along the second transverse axis 29 in a first direction so as to further compress the first spring 78. Movement along the second transverse axis 29 is possible in part because the third and fourth tongues 36, 38 are received in the third and fourth grooves 40, 42.

In contrast, turning the first positioner 74 counterclockwise causes the distal tip thereof to move away from third wall 82. This relieves the first spring 78, thus permitting it to expand as it pushes the upwardly-protruding block 54 away from the third wall 82. The result is relative motion between the frame 34 and the base plate 44 along the second transverse axis 29 but in a second direction that is opposite the first direction.

In both cases, the first spring 78 tends to isolate the frame 34 from the effects of any wiggling or play in the adjustable mount 16. This promotes more precise adjustment.

The process for adjusting the mount 16 along the first transverse axis 27 is carried out in a manner analogous to that described in connection with the second transverse axis 29.

Referring again to FIG. 8, a second positioner 84, which is of the same type as the first positioner 74, passes through the second aperture 52. As a result, the distal end of the second positioner 84 rests upon an outwardly-facing face 87 of the first downwardly-protruding block 56. Second and third springs 90, 92 extend between a spring-facing side 94 of the second downwardly-protruding block 58 and a fourth wall 96 of the frame. The second and third springs 90, 92 are slightly shorter than the first spring because they extend across a smaller gap. In the preferred embodiment, the second and third springs 90, 92 are 0.5 inches long in their uncompressed state.

The second spring 90 is a helical spring that defines a passage through its helix. A second set screw 86 that passes through a portion of this passage is fixed to either the fourth wall 96 or to the outwardly-facing wall 80 of the downwardly-protruding block 58. Similarly, the third spring 92 is a helical spring that defines a passage through the helix. A third set screw 88 that passes through a portion of this passage is also fixed to either the fourth wall 96 or to the outwardly-facing wall 80 of the downwardly-protruding block 58.

The second and third set screws 86, 88 thus prevent the second and third springs 90, 92 from shifting during operation and also prevents the second and third springs 90, 92 from buckling.

The fourth wall 96 is parallel to the second wall 48 and perpendicular to both the first wall 46 and the second wall 82. The second and third springs 90, 92 are compressed so as to exert forces that urges the second downwardly-protruding block 58 towards the second wall 48.

Turning the second positioner 84 clockwise causes the distal tip thereof to move towards the fourth wall 96, thus exerting a force on the aperture-facing side 62 of the first downwardly-protruding block 56. This force is transmitted to the second downwardly-protruding block 58. In response, and as a result of the first and second tongues being received in the first and second grooves, an adjustment along the first transverse axis 27 occurs. This adjustment compresses the second and third springs 90, 92.

In contrast, turning the second positioner 84 counterclockwise causes the distal tip thereof to move away from the fourth wall 96, thus permitting the second and third springs 90, 92 to cause an adjustment along the second transverse axis 29, but in the opposite direction.

Each corner of the frame 34 includes a wing 98 having a clamping aperture 100 that extends therethrough. Each clamping aperture 100 is aligned with a corresponding one of the clearance holes 66. To prevent movement after having adjusted the mount 16 along the second transverse axis 29, it is useful to insert a clamping bolt through the clamping aperture 100 and to screw it into the corresponding clearance hole 66.

Similarly, each corner of top plate 24 has a clamping aperture 102 that extends through the top plate 24. Each such clamping aperture 102 is aligned with one of the threaded holes 72 in the frame 34. To prevent movement after having adjusted the mount 16 along the first transverse axis 27, it is useful to insert a clamping bolt through the clamping aperture 102 and to screw it into the corresponding threaded hole 72.

Given currently available machining tolerances, a mount 16 as described herein can be expected to achieve translation that is close to being along the desired transverse axis 27, 29. For example, in some embodiments, a translation of approximately 125 microns along a transverse axis 27, 29 will result in a deviation from that axis of no more than approximately one micron.

A mount 16 as described herein provides a particularly compact design while being able to maintain alignment when reoriented relative to a gravity field. In some embodiments, the mount's volume is on the order 3.5"×3"×1.3" with a 0.2" shim thickness. As such, it is particularly suitable for precision adjustment of components 14 that are on a moving structure.

The apparatus as described herein is also scalable. As such, it is able to support components of varying size. Moreover, when used with other components, the apparatus as described herein can be used to correct for misalignments in those components. This means that the tolerance requirements for machining those components can be relaxed, thereby reducing overall costs for the system as a whole.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An apparatus comprising a mount for mounting a component that is subjected to a dynamically-varying load, said mount comprising: a base plate to be fastened onto a support, a top plate, a frame between said base plate and top plate, said frame having an interior that is defined by a first wall that defines a first aperture for receiving a first positioner, a second wall that defines a second aperture for receiving a second positioner, a third wall that is opposite said first wall, and a fourth wall that is opposite said second wall, said mount further comprising: first and second sides that extend from said base plate and into said frame's interior, wherein said first side faces said first aperture such that, when inserted through said first aperture, said first positioner abuts said first side and wherein said second side defines a first gap that is between said second side and said third wall, third and fourth sides that extend from said top plate and into said frame's interior, wherein said third side faces said second aperture such that, when inserted through said second aperture, said second positioner abuts said third side and wherein said fourth side defines a second gap that is between said fourth side and said fourth wall, and first and second movement interfaces, said first movement interfaces facilitating guided movement of said top plate relative to said frame along a first axis and said second movement interface facilitating guided movement of said frame relative to said base plate along a second axis, and first and second locking interfaces, wherein said first locking interface suppresses said movement along said first axis and said second locking interface suppresses movement along said second axis.

2. The apparatus of claim 1, wherein said frame and said top plate define holes that are aligned to receive a bolt that, when inserted, suppresses said movement along said first axis, said holes defining said first locking interface and wherein said frame and said bottom plate define holes that are aligned to receive a bolt that, when inserted, suppresses said movement along said second axis, said holes defining said second locking interface.

3. The apparatus of claim 1, wherein said first and second movement interfaces comprises a groove and a tongue that engages said groove so as to permit relative movement between said tongue and said groove along an axis selected from the group consisting of said first axis and said second axis.

4. The apparatus of claim 1, wherein said first movement interface comprises a first structure selected from the group consisting of a tongue and a groove, wherein said first structure is on said frame, wherein a plate selected from the group consisting of said top plate and said bottom plate comprises a second structure that is complementary to said first structure, wherein said second structure is selected from the group consisting of a tongue and a groove.

5. The apparatus of claim 1, further comprising a block that extends from said base plate and into said frame's interior, wherein said first side is a side of said block.

6. The apparatus of claim 1, further comprising a block that extends from said top plate and into said frame's interior, wherein said third side is a side of said block.

7. The apparatus of claim 1, further comprising first, second, and third blocks, wherein said first and third blocks extend into said frame from a first direction, wherein said second block extends into said frame from a second direction, wherein said second block is disposed between said first and third blocks, and wherein said sides are sides of said blocks.

8. The apparatus of claim 1, further comprising first, second, and third blocks, wherein said first and third blocks extend into said frame from said top plate, wherein said second block extends into said frame from said bottom plate, wherein said second block is disposed between said first and third blocks, wherein said first side is a side of said second block and wherein said third side is a side of said first block.

9. The apparatus of claim 8, wherein said second side is a side of said second block and wherein said fourth side is a side of said third block.

10. The apparatus of claim 1, further comprising a shim on said top plate.

11. The apparatus of claim 1, wherein the apparatus is configured to be included in a satellite communication system.

12. The apparatus of claim 1, wherein each of said first and second positioners comprises a positioning screw.

13. The apparatus of claim 1, wherein said base plate comprises a thickened portion that forms a block that extends into said frame's interior, wherein said first side is a side of said block.

14. The apparatus of claim 1, wherein said top plate comprises a first thickened portion that forms a block that extends into said frame's interior, wherein said third side is a side of said block.

15. The apparatus of claim 1, wherein said top plate comprises a first thickened portion that forms a first block that extends into said frame's interior, said top plate comprises a second thickened portion that forms a second block that extends into said frame's interior, wherein said third side is a side of said first block, and wherein said fourth side is a side of said second block.

16. The apparatus of claim 1, further comprising a spring and a pin, wherein said spring extends across said first gap and defines a passageway and wherein said pin extends through at most a portion of said passageway defined by said spring.

17. The apparatus of claim 1, further comprising a first spring that extends across said first gap and a second spring that extends across said second gap.

18. A method for adjusting a position of a component that is mounted on a mount that comprises a frame between first and second plates, said method comprising translating, via a first positioner, said first plate relative to said frame along a first axis and translating, via a second positioner, said second plate relative to said frame along a second axis, wherein translation of said first plate is decoupled from translation of said second plate, wherein translating said first plate comprises exerting a first force with said first positioner against a face of a block protruding from said first plate that is within an interior of said frame, wherein exerting said first force causes a change in a second force that is exerted against said frame in a direction that is opposite that of said first force.

* * * * *